(12) United States Patent
Ishige et al.

(10) Patent No.: US 10,415,772 B2
(45) Date of Patent: Sep. 17, 2019

(54) LIGHT SOURCE UNIT AND PROJECTION-TYPE DISPLAY

(71) Applicant: SONY CORPORATION, Tokyo (JP)

(72) Inventors: Masahiro Ishige, Kanagawa (JP); Izushi Kobayashi, Tokyo (JP); Yoshihisa Sato, Saitama (JP); Hiroki Morita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 10 days.

(21) Appl. No.: 15/569,519

(22) PCT Filed: Apr. 20, 2016

(86) PCT No.: PCT/JP2016/062496
§ 371 (c)(1),
(2) Date: Oct. 26, 2017

(87) PCT Pub. No.: WO2016/185861
PCT Pub. Date: Nov. 24, 2016

(65) Prior Publication Data
US 2019/0049075 A1 Feb. 14, 2019

(30) Foreign Application Priority Data

May 15, 2015 (JP) .................................. 2015-099920

(51) Int. Cl.
*F21V 21/00* (2006.01)
*F21S 2/00* (2016.01)
(Continued)

(52) U.S. Cl.
CPC ................ *F21S 2/005* (2013.01); *F21V 7/22* (2013.01); *F21V 9/30* (2018.02); *F21V 9/40* (2018.02);
(Continued)

(58) Field of Classification Search
CPC ............... F21S 2/005; F21V 9/30; F21V 9/40
(Continued)

(56) References Cited

U.S. PATENT DOCUMENTS

2005/0231957 A1\* 10/2005 Wynne Willson .... F21S 10/007 362/322
2010/0128462 A1\* 5/2010 Chern ................... F21S 10/007 362/84

(Continued)

FOREIGN PATENT DOCUMENTS

CN 104238243 A 12/2014
EP 2 602 536 \* 6/2013
(Continued)

OTHER PUBLICATIONS

International Search Report and Written Opinion of PCT Application No. PCT/JP2016/062496, dated Aug. 2, 2016, 07 pages of ISRWO.

Primary Examiner — Laura K Tso
(74) Attorney, Agent, or Firm — Chip Law Group

(57) ABSTRACT

A light source unit according to an embodiment of the disclosure includes a substrate configured to be rotatable, a phosphor layer disposed at a center of the substrate, a light source that irradiates the phosphor layer with exciting light, and a support section that supports a portion, of the substrate, except for the center of the substrate. This makes it difficult for heat generated in the phosphor layer to travel to a motor through the substrate.

16 Claims, 17 Drawing Sheets

(51) Int. Cl.
*F21V 9/40* (2018.01)
*F21V 9/30* (2018.01)
*F21V 7/22* (2018.01)
*G03B 21/14* (2006.01)
*H04N 5/74* (2006.01)
*F21V 29/15* (2015.01)
*F21V 29/502* (2015.01)
*G03B 21/16* (2006.01)
*G03B 21/20* (2006.01)
*F21Y 115/10* (2016.01)

(52) U.S. Cl.
CPC ............ *F21V 29/15* (2015.01); *F21V 29/502* (2015.01); *G03B 21/14* (2013.01); *G03B 21/16* (2013.01); *G03B 21/204* (2013.01); *H04N 5/74* (2013.01); *F21Y 2115/10* (2016.08)

(58) Field of Classification Search
USPC .......................................................... 362/84
See application file for complete search history.

(56) References Cited

U.S. PATENT DOCUMENTS

| 2013/0100423 | A1 | 4/2013 | Yamagishi et al. |
| 2014/0362350 | A1 | 12/2014 | Takamatsu |
| 2016/0252722 | A1* | 9/2016 | Li ................... G02B 26/008 362/84 |
| 2018/0095350 | A1* | 4/2018 | Tanaka .................. G03B 21/16 |
| 2018/0119923 | A1* | 5/2018 | Takada .................... F21V 9/40 |

FOREIGN PATENT DOCUMENTS

| JP | 2013-101317 A | 5/2013 |
| JP | 2013-130605 A | 7/2013 |
| JP | 2014-238485 A | 12/2014 |

\* cited by examiner

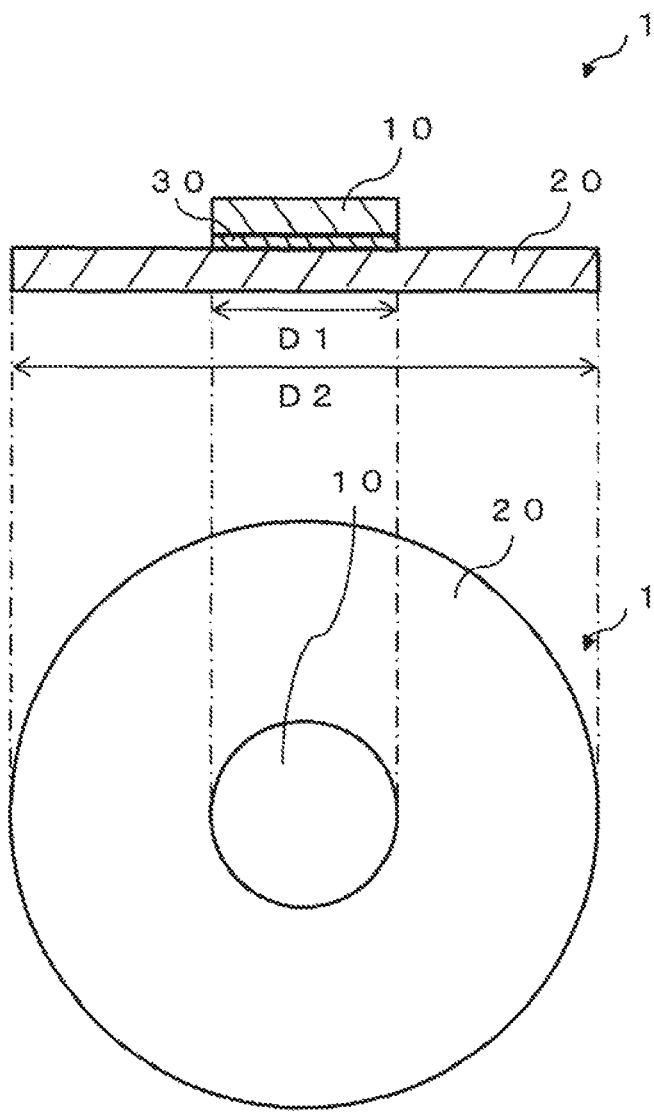

[FIG. 2]
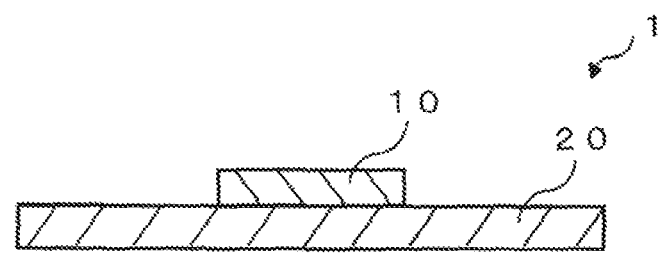

[FIG. 4]
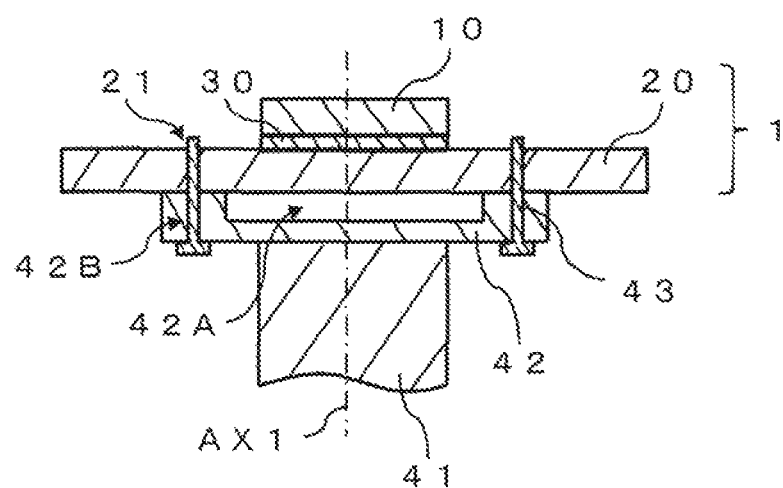

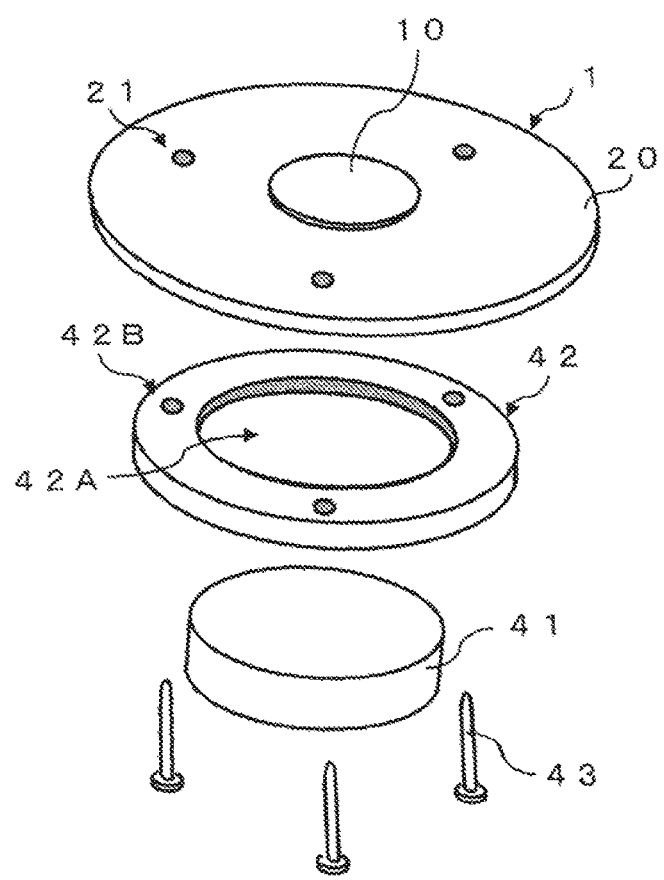
[FIG. 5]

[FIG. 6]
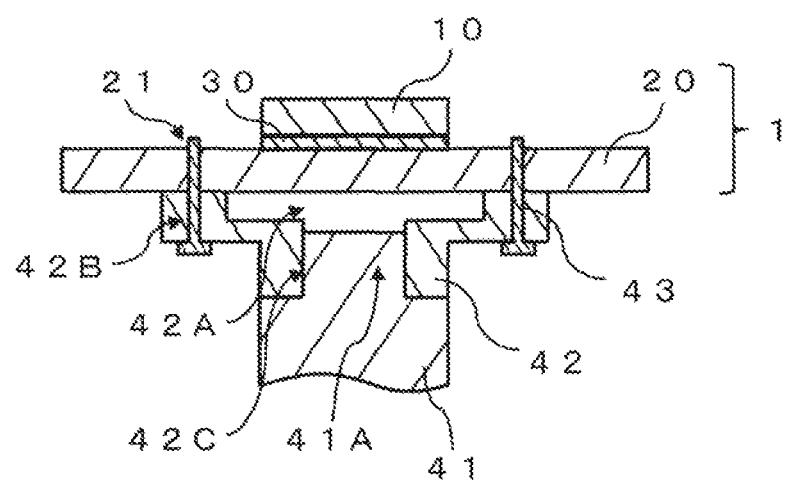

[FIG. 7]
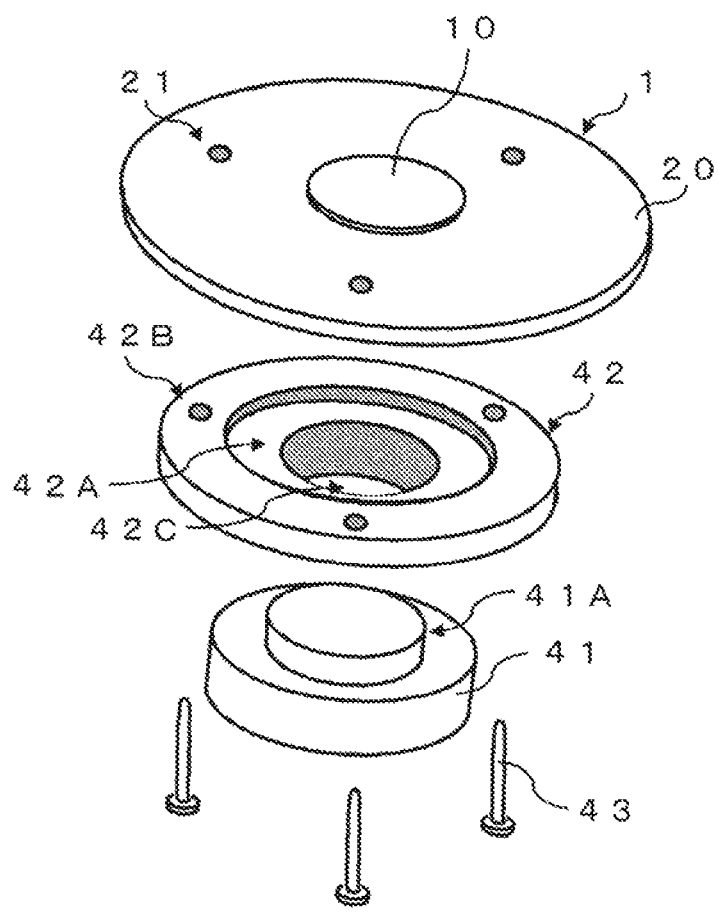

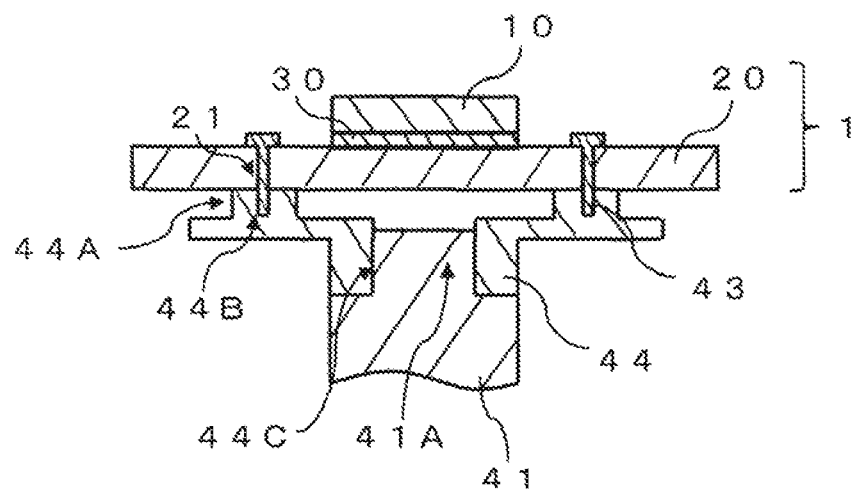
[FIG. 8]

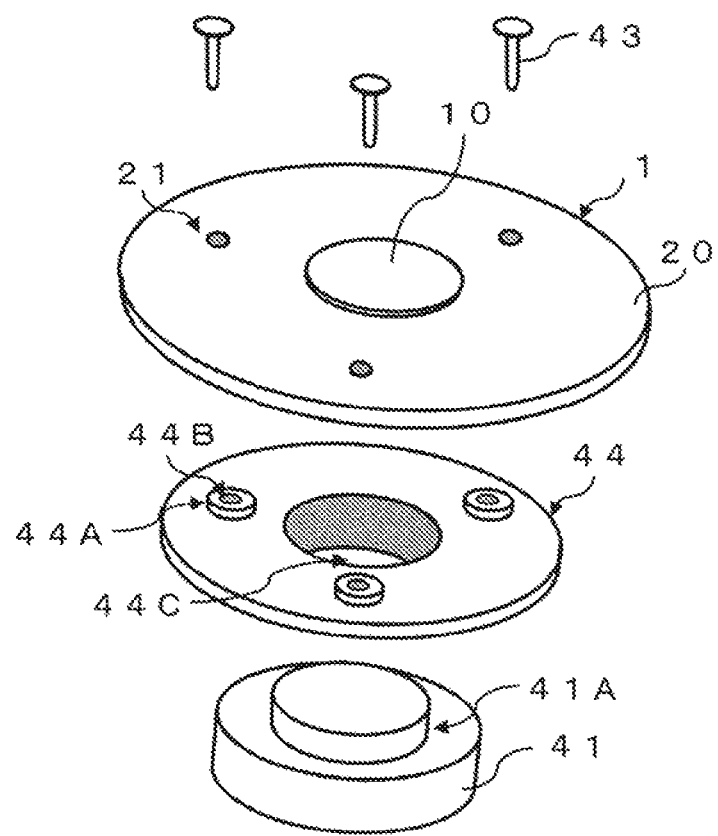

[ FIG. 10 ]
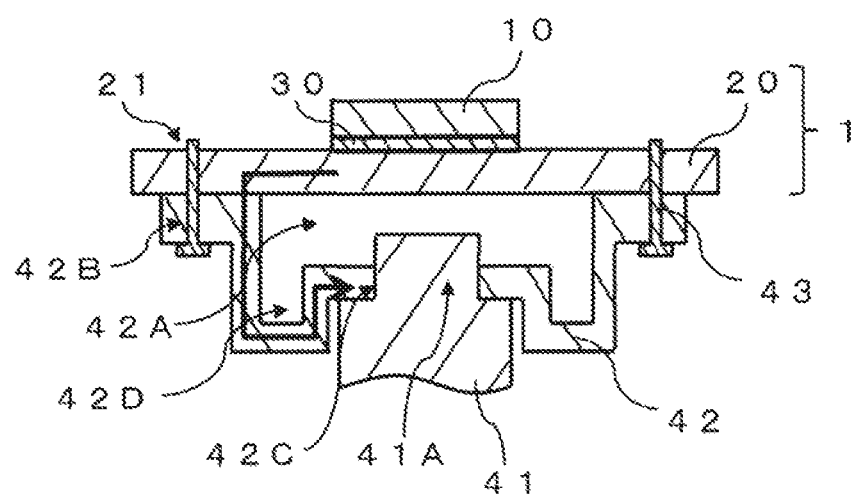

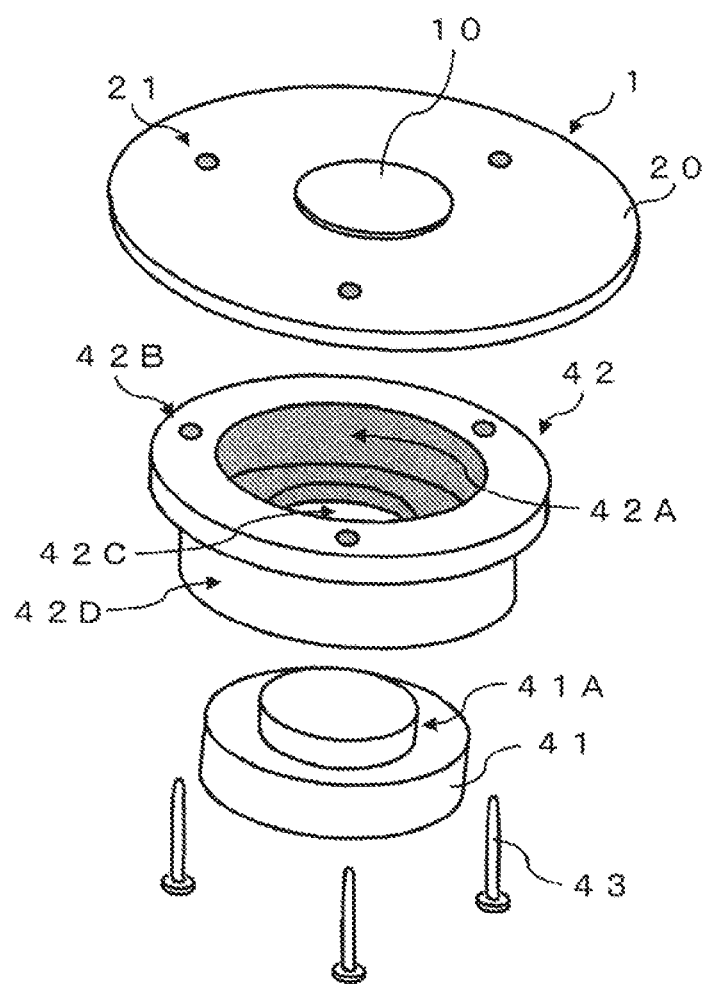
[FIG. 11]

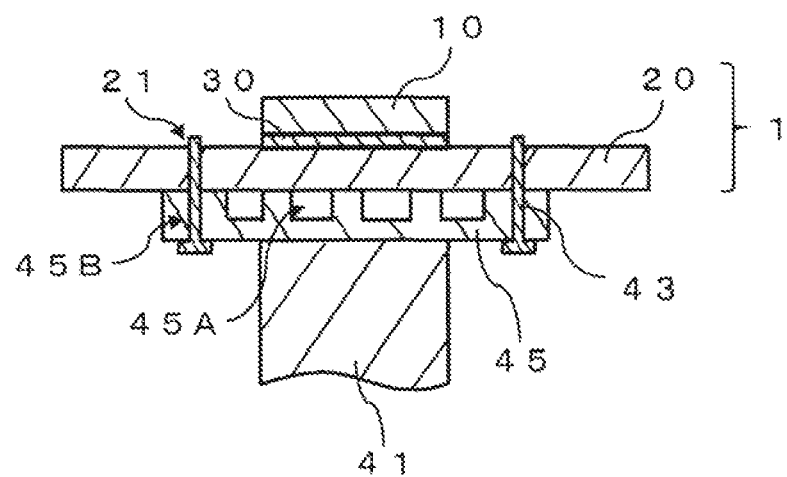
[FIG. 12]

[FIG.13]
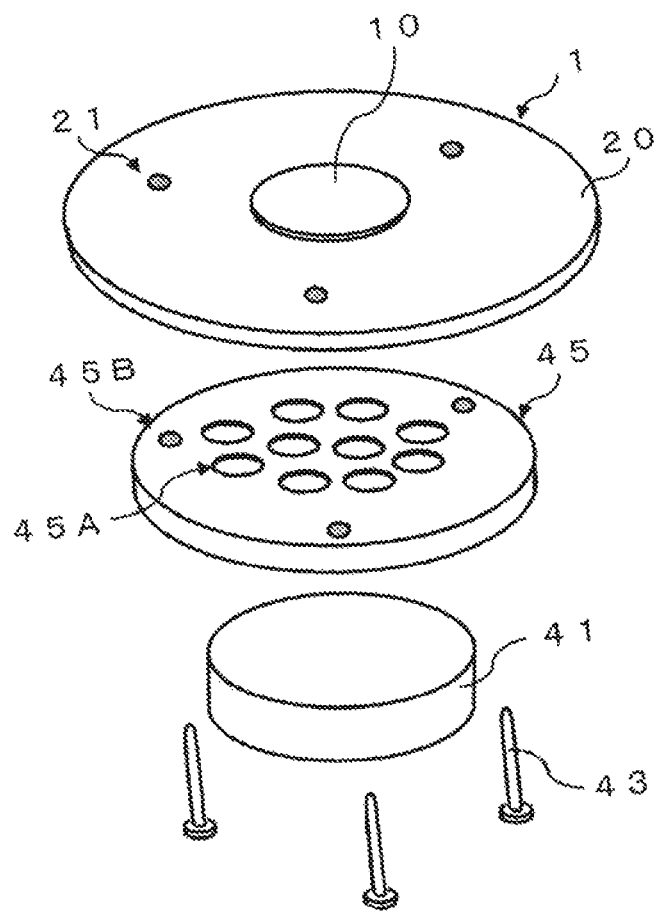

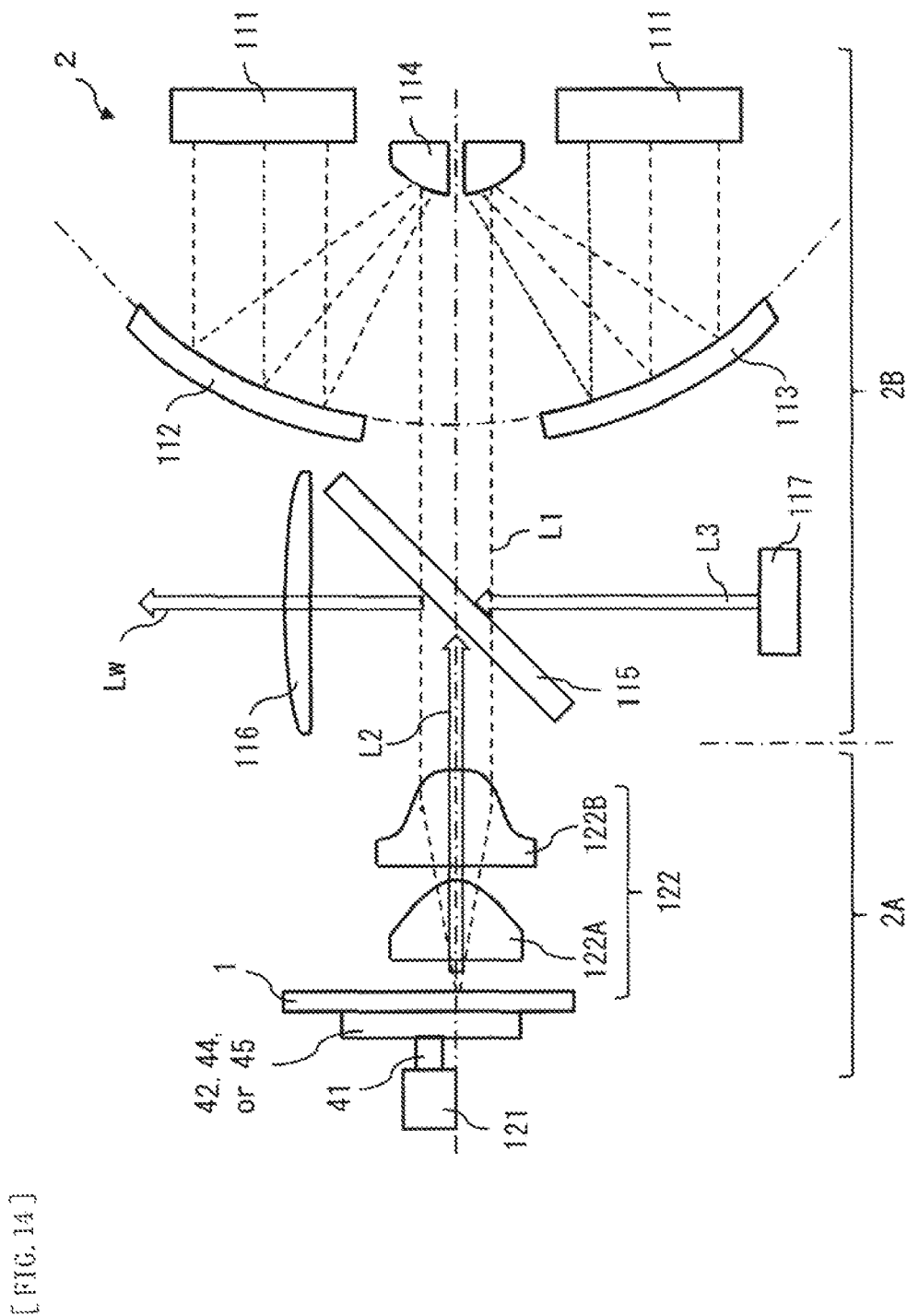
[FIG. 14]

[ FIG. 15 ]
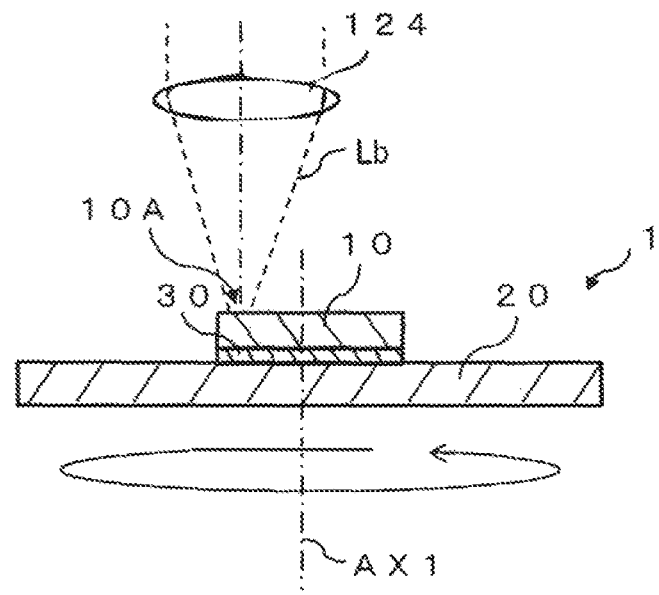
[ FIG. 16 ]
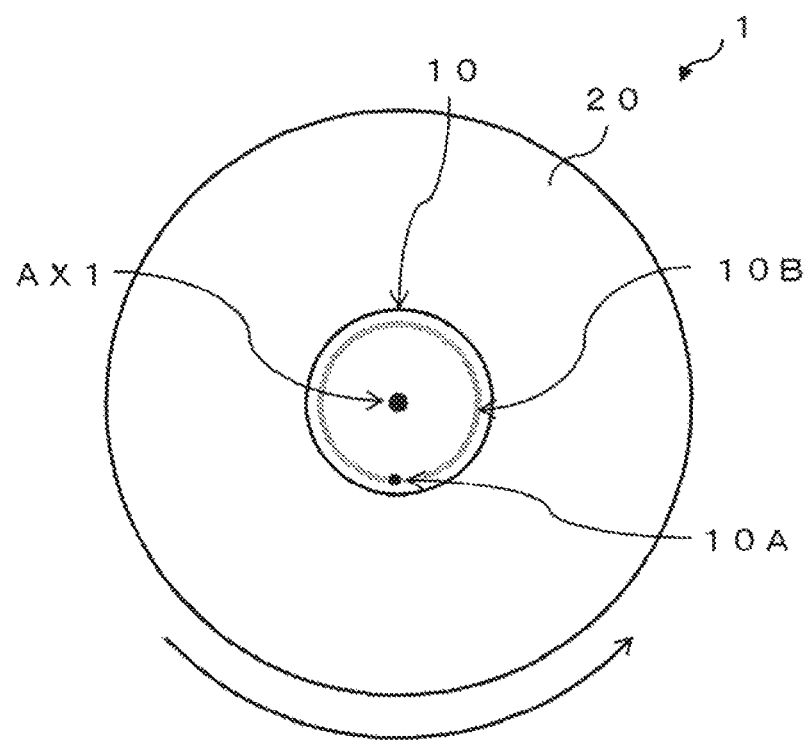

[ FIG. 17 ]
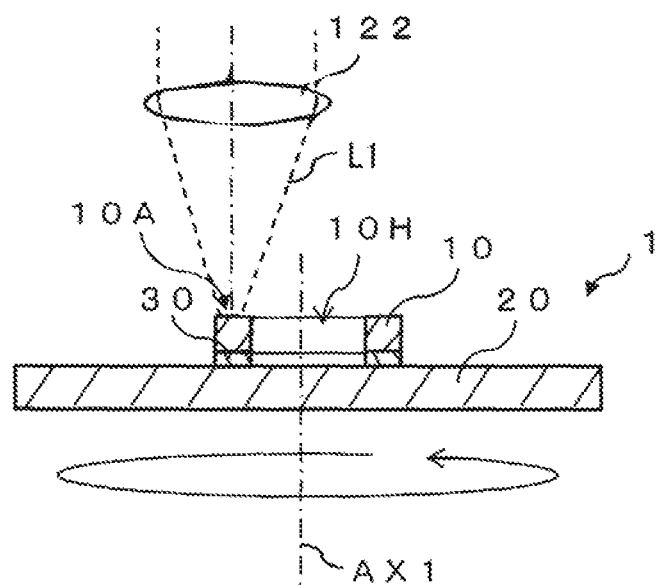
[ FIG. 18 ]
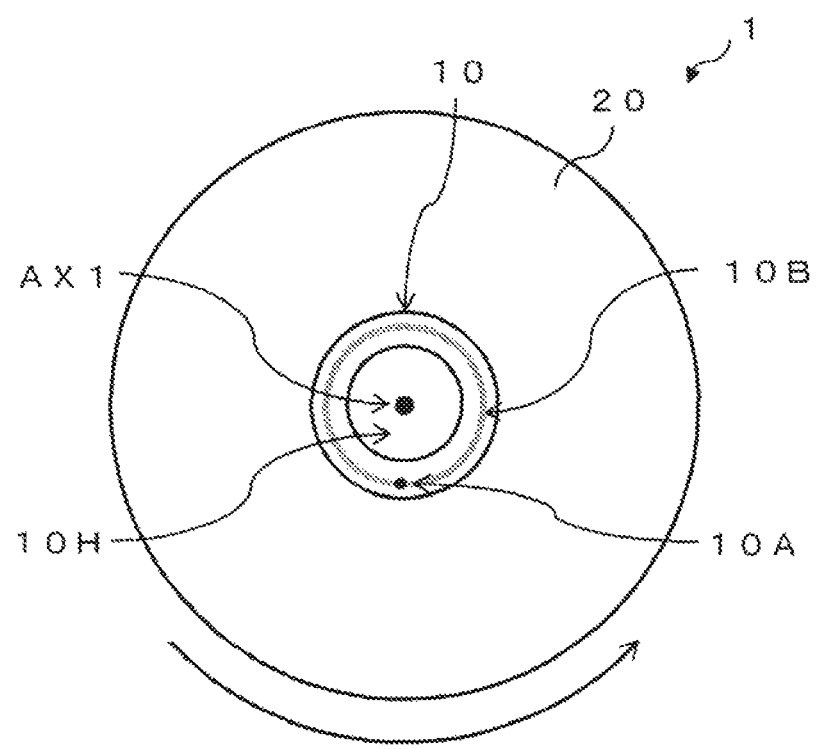

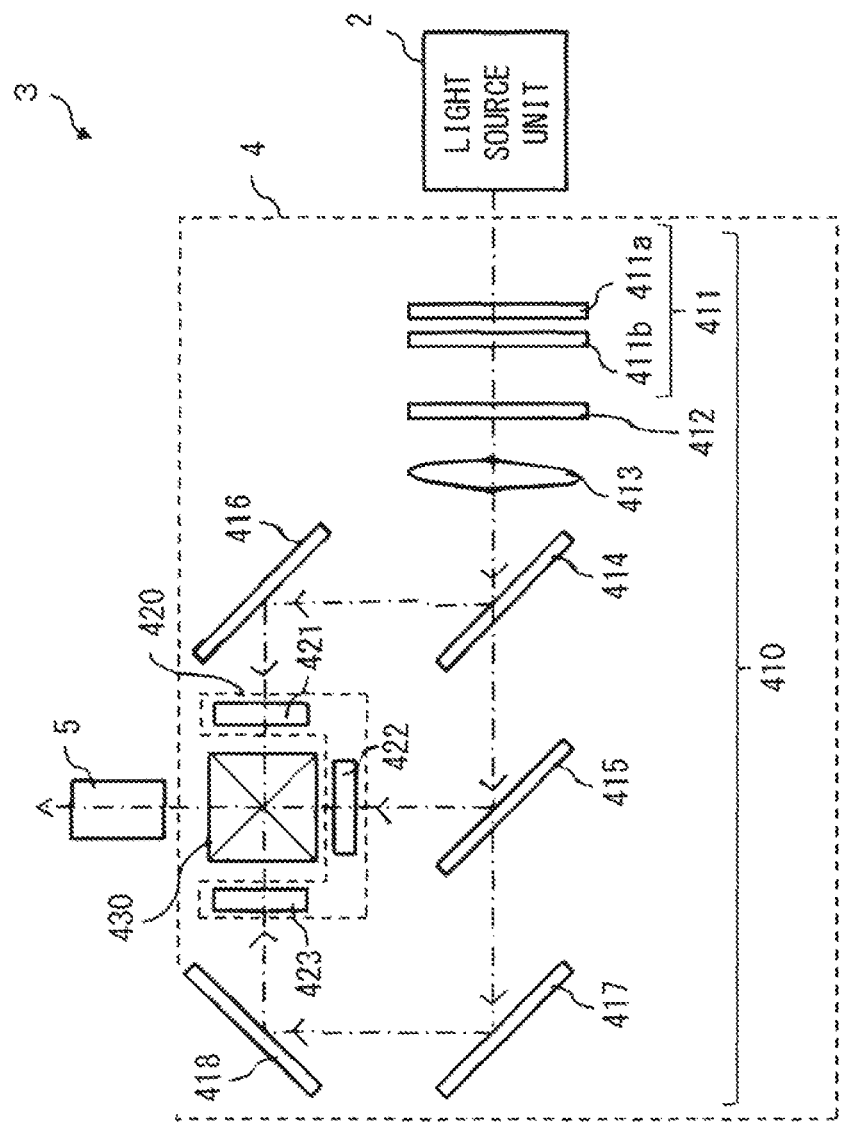
[FIG. 19]

LIGHT SOURCE UNIT AND PROJECTION-TYPE DISPLAY

CROSS REFERENCE TO RELATED APPLICATIONS

This application is a U.S. National Phase of International Patent Application No. PCT/JP2016/062496 filed on Apr. 20, 2016, which claims priority benefit of Japanese Patent Application No. JP 2015-099920 filed in the Japan Patent Office on May 15, 2015. Each of the above-referenced applications is hereby incorporated herein by reference in its entirety.

TECHNICAL FIELD

The disclosure relates to a light source unit and a projection-type display.

BACKGROUND ART

As a light source used for a projection-type display such as a projector, a solid-state light source having a long life and a wide color gamut has been attracting attention. In recent years, a light source unit that utilizes light emitted from a phosphor by irradiating the phosphor with light of a solid-state light source has been used for a projector, etc.

The above-described light source unit includes, for example, a phosphor layer, and a solid-state light source that irradiates the phosphor layer with exciting light. For light emission of the phosphor layer, there is a phenomenon called luminance saturation or temperature quenching. This is such a phenomenon that, in a case where an output of the exciting light is increased, a part of a conversion loss in the phosphor layer changes to heat that causes the phosphor layer to generate heat, and fluorescence conversion efficiency thereby drops. In a state where the fluorescence conversion efficiency is low, an efficient, bright light source unit is not implementable. Hence, the phosphor layer is provided on a surface of a substrate having high thermal conductivity.

CITATION LIST

Patent Literature

PTL 1: Japanese Unexamined Patent Application Publication No. 2013-130605

SUMMARY OF INVENTION

Incidentally, a phosphor layer is rotated by a motor attached to a substrate having high thermal conductivity. There has been such an issue that, in a case where heat generated in the phosphor layer transfers to the motor through the substrate, a temperature rise of the motor occurs, which causes a decline in reliability of the motor.

It is therefore desirable to provide a light source unit and a projection-type display that make it possible to suppress a decline in reliability of a motor due to a temperature rise of the motor.

A light source unit according to an embodiment of the disclosure includes a substrate configured to be rotatable, a phosphor layer disposed at a center of the substrate, a light source that irradiates the phosphor layer with exciting light, and a support section that supports a portion, of the substrate, except for the center of the substrate.

A projection-type display according to an embodiment of the disclosure includes a substrate configured to be rotatable, a phosphor layer disposed at a center of the substrate, a light source that irradiates the phosphor layer with exciting light, and a support section that supports a portion, of the substrate, except for the center of the substrate. This projection-type display further includes an optical modulation section that generates image light by modulating the exciting light outputted from the light source, on a basis of an image signal, and a projection section that projects the image light generated by the optical modulation section.

In the light source unit and the projection-type display according to the respective embodiments of the disclosure, there is provided the support section that supports the portion, of the substrate, except for the center of the substrate. This makes it difficult for heat generated in the phosphor layer to travel to a motor through the substrate, as compared with a case where a support section supports an entire center of a substrate, at which a phosphor layer is disposed.

The light source unit and the projection-type display according to the respective embodiments of the disclosure make it difficult for the heat generated in the phosphor layer to travel to the motor through the substrate and thus, it is possible to suppress a decline in reliability of the motor due to a temperature rise of the motor. It is to be noted that effects of the disclosure are not limited to those described above, and may be any of effects described herein.

BRIEF DESCRIPTION OF DRAWINGS

FIGS. 1(A) and 1(B) are diagrams illustrating a cross-sectional configuration example and a plane configuration example of a phosphor substrate used for a light source unit according to a first embodiment of the disclosure.

FIG. 2 is a diagram illustrating a modification example of a cross-sectional configuration of the phosphor substrate illustrated in FIGS. 1(A) and 1(B).

FIG. 4 is a diagram illustrating a cross-sectional configuration example when a shaft of a motor is attached to the phosphor substrate illustrated in FIGS. 1(A) and 1(B), through an attachment.

FIG. 5 is a perspective diagram illustrating an exploded state of components attached to the phosphor substrate in FIG. 4.

FIG. 6 is a diagram illustrating a cross-sectional configuration example when a shaft of a motor is attached to the phosphor substrate illustrated in FIGS. 1(A) and 1(B), through an attachment.

FIG. 7 is a perspective diagram illustrating an exploded state of components attached to the phosphor substrate in FIG. 6.

FIG. 8 is a diagram illustrating a cross-sectional configuration example when a shaft of a motor is attached to the phosphor substrate illustrated in FIGS. 1(A) and 1(B), through an attachment.

FIG. 9 is a perspective diagram illustrating an exploded state of components attached to the phosphor substrate in FIG. 8.

FIG. 10 is a diagram illustrating a cross-sectional configuration example when a shaft of a motor is attached to the phosphor substrate illustrated in FIGS. 1(A) and 1(B), through an attachment.

FIG. 11 is a perspective diagram illustrating an exploded state of components attached to the phosphor substrate in FIG. 10.

FIG. 12 is a diagram illustrating a cross-sectional configuration example when a shaft of a motor is attached to the phosphor substrate illustrated in FIGS. 1(A) and 1(B), through an attachment.

FIG. 13 is a perspective diagram illustrating an exploded state of components attached to the phosphor substrate in FIG. 12.

FIG. 14 is a diagram illustrating a schematic configuration example of the light source unit according to the first embodiment of the disclosure.

FIG. 15 is a diagram for description of an example of application of exciting light to the phosphor substrate, in the light source unit illustrated in FIG. 14.

FIG. 16 is a diagram for description of an example of application of exciting light to the phosphor substrate, in the light source unit illustrated in FIG. 14.

FIG. 17 is a diagram for description of an example of application of exciting light to the phosphor substrate, in the light source unit illustrated in FIG. 14.

FIG. 18 is a diagram for description of an example of application of exciting light to the phosphor substrate, in the light source unit illustrated in FIG. 14.

FIG. 19 is a diagram illustrating a schematic configuration example of a projection-type display according to a second embodiment of the disclosure.

DESCRIPTION OF EMBODIMENTS

Figure 3A:
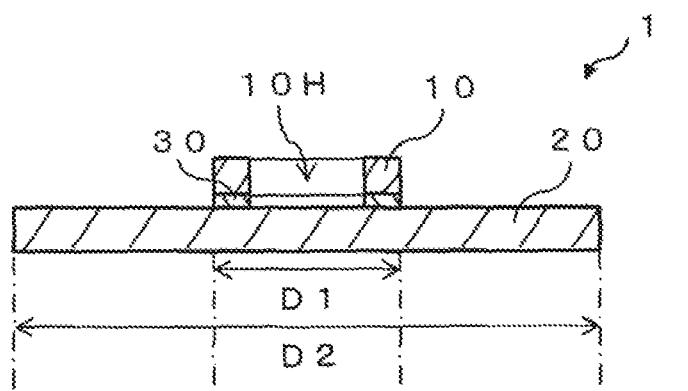
FIGS. 3(A) and 3(B) are diagrams illustrating a modification example of a cross-sectional configuration and a modification example of a plane configuration of the phosphor substrate illustrated in FIGS. 1(A) and 1(B).

Some embodiments of the disclosure will be described below in detail with reference to the drawings. The following description is a specific example of the invention, and the invention is not limited to the following embodiments. In addition, as for placement and dimensions, as well as a dimension ratio, etc., of each component illustrated in each figure, the invention is not limited thereto either. It is to be noted that the description will be provided in the following order.

1. First Embodiment (a phosphor substrate, and a light source unit)
2. Second Embodiment (a projection-type display)

1. <First Embodiment>

[Configuration]

A configuration of a phosphor substrate 1 used for a light source unit according to a first embodiment of the disclosure will be described. The phosphor substrate 1 corresponds to a specific example of a "phosphor substrate" of the disclosure. FIGS. 1(A) and 1(B) illustrate a cross-sectional configuration example and a plane configuration example of the phosphor substrate 1 according to the first embodiment of the technology. The phosphor substrate 1 is applicable to, for example, a light conversion section 2A of a light source unit 2 (see FIG. 14) described later. The phosphor substrate 1 includes a substrate 20 and a phosphor layer 10.

The substrate 20 is configured to be rotatable, and is, for example, rotationally symmetric. The substrate 20 has, for example, a shape to be rotationally symmetric about a rotation axis AX1 of a shaft 41 described later, when being attached to the shaft 41 through an attachment 42 described later. The substrate 20 has, for example, a disk shape as illustrated in FIG. 1 (B). The substrate 20 is configured of a material having high thermal conductivity, and is configured of, e.g., a metal/alloy-based material, a ceramic-based material, a ceramic-metal system, a crystal such as sapphire, diamond, glass, etc. Here, examples of the metal/alloy-based material include Al, Cu, Mo, W, CuW, etc. Examples of the ceramic-based material include SiC, AlN, $Al_2O_3$, $Si_3N_4$, $ZrO_2$, $Y_2O_3$, etc. Examples of the ceramic-metal system include SiC—Al, SiC—Mg, SiC—Si, etc.

The substrate 20 has a diameter D2 of, for example, 20 mm or more and 100 mm or less. The substrate 20 has a thickness of, for example, 0.3 mm or more and 2.0 mm or less. The substrate 20 may be configured of a single layer, or may be configured of a plurality of layers. When the substrate 20 is configured of a single layer, it is preferable that the substrate 20 be configured of a material having high reflectance. When the substrate 20 is configured of a plurality of layers, it is preferable that a layer forming a top surface of the substrate 20 be configured of a material having high reflectance.

The phosphor layer 10 is disposed at a center of the substrate 20. The phosphor layer 10 has, for example, a disk shape as illustrated in FIG. 1 (B), and is disposed concentrically with the substrate 10. When light of a specific wavelength enters, the phosphor layer 10 is excited by the light (incident light) of the specific wavelength to emit light of a wavelength region different from the wavelength of the incident light. The phosphor layer 10 includes, for example, a fluorescent substance that emits yellow fluorescence (yellow light) when excited by blue light having a center wavelength of about 445 nm. The phosphor layer 10 is configured, for example, to convert a part of blue light into yellow light when the blue light enters. Examples of the fluorescent substance included in the phosphor layer 10 include a YAG-based phosphor (e.g., $Y_3Al_5O_{12}$). The YAG-based phosphor is one of fluorescent substances that emit yellow fluorescence (yellow light) when excited by blue light having a center wavelength of about 445 nm. In a case where the fluorescent substance included in the phosphor layer 10 is the YAG-based phosphor, the YAG-based phosphor may be doped with Ce.

The phosphor layer 10 may include an oxide phosphor other than the YAG-based phosphor. The phosphor layer 10 may include a phosphor other than the oxide phosphor, or may include, for example, an oxynitride phosphor, a nitride-based phosphor, a sulfide phosphor, or a silicate-based phosphor. Here, the oxynitride phosphor is, for example, a BSON phosphor (e.g., $Ba_3Si_6O_{12}N_2$: $Eu^{2+}$). The nitride-based phosphor is, for example, a CASN phosphor (e.g., $CaAlSiN_3$: Eu) or a SiAlON phosphor. The sulfide phosphor is, for example, a SGS phosphor (e.g., $SrGa_2S_4$: Eu). The silicate-based phosphor is, for example, a TEOS phosphor (e.g., $Si(OC_2H_5)_4$).

The phosphor layer 10 includes, for example, a powder phosphor, and a binder that holds the powder phosphor. The phosphor layer 10 may be, for example, a powder phosphor, and formed by solidifying the powder phosphor by using an inorganic material. The phosphor layer 10 may be formed by, for example, applying a material, which includes a powder phosphor and a binder that holds the powder phosphor, onto the substrate 20. The phosphor layer 10 may be formed by, for example, sintering a material, which includes a powder phosphor and a binder (e.g., a ceramic material) that holds the powder phosphor. It is to be noted that examples of the powder phosphor included in the phosphor layer 10 include the above-described various phosphors. The phosphor layer 10 may be a polycrystalline plate configured of a phosphor material. The polycrystalline plate is formed by processing a polycrystalline material configured of a phosphor material into a plate shape.

It is preferable that the substrate 20 and the phosphor layer 10 be configured of materials so that a difference in linear expansion coefficient between the substrate 20 and the phosphor layer 10 is $1 \times 10^{-6}$ cm/° C. or less per 1 m. In a case where the phosphor layer 10 is a polycrystalline plate configured of the YAG-based phosphor doped with Ce, the linear expansion coefficient of the phosphor layer 10 is about $8.0 \times 10^{-6}$ m/° C. per 1 m. In a case where the substrate 20 is configured of a titanium alloy, the linear expansion coefficient of the substrate 20 is about $8.4 \times 10^{-6}$ m/° C. per 1 m. Hence, in a case where the phosphor layer 10 is the polycrystalline plate configured of the YAG-based phosphor doped with Ce and the substrate 20 is configured of the titanium alloy, the difference in linear expansion coefficient between the substrate 20 and the phosphor layer 10 is $0.4 \times 10^{-6}$ cm/° C. per 1 m. In other words, in a case where the phosphor layer 10 is a polycrystalline plate configured of a ceramic material and the substrate 20 is configured of a titanium alloy, the difference in linear expansion coefficient between the substrate 20 and the phosphor layer 10 is $1 \times 10^{-6}$ cm/° C. or less per 1 m.

The substrate 20 may be configured of a material having a large linear expansion coefficient, e.g., aluminum ($23 \times 10^{-6}$ cm/° C. per 1 m), stainless steel ($17 \times 10^{-6}$ cm/° C. per 1 m), or copper ($17 \times 10^{-6}$ cm/° C. per 1 m). In this case, however, the difference in linear expansion coefficient between the substrate 20 and the phosphor layer 10 is a value much larger than $1 \times 10^{-6}$ cm/° C. per 1 m.

Assume that, for example, the phosphor layer 10 is configured of a ceramic material and the substrate 20 is configured of aluminum. Further, assume that, for example, the phosphor layer 10 has a diameter of 20 mm, and the phosphor layer 10 has a temperature of 200° C. and the substrate 20 has a temperature of 150° C., at a room temperature of 20° C. Respective expansion quantities at this time are as follows.

Phosphor layer 10: 14.4 mm
Substrate 20: 29.9 mm
The difference in expansion quantity is about 15.5 mm.

On the other hand, assume that, for example, the phosphor layer 10 is configured of a ceramic material, and the substrate 20 is configured of a titanium alloy. Further, assume that, for example, the phosphor layer 10 has a diameter of 20 mm, and the phosphor layer 10 has a temperature of 200° C. and the substrate 20 has a temperature of 150° C., at a room temperature of 20° C. Respective expansion quantities at this time are as follows.

Phosphor layer 10: 14.4 mm
Substrate 20: 10.9 mm
The difference in expansion quantity is about 3.5 mm, which is as small as ⅕ of the above-described expansion quantity.

The phosphor layer 10 has a diameter D1 of, for example, 3 mm or more and 60 mm or less. When the substrate 20 has the diameter D2 of 20 mm, the diameter D1 of the phosphor layer 10 is, for example, 3 mm. When the diameter D2 of the substrate 20 is 100 mm, the diameter D1 of the phosphor layer 10 is, for example, 60 mm. The phosphor layer 10 may be configured of a single layer, or may be configured of a plurality of layers. When the phosphor layer 10 is configured of a plurality of layers, a layer forming a surface (an undersurface) on substrate 20 side of the phosphor layer 10 may include a material having high reflectance.

The phosphor substrate 1 may further include, for example, as illustrated in FIGS. 1(A) and 1(B), a fixing layer 30 between the substrate 20 and the phosphor layer 10 to fix the substrate 20 and the phosphor layer 10 to each other. The fixing layer 30 includes, for example, an organic adhesive, or an inorganic adhesive, low-melting glass, or solder. The organic adhesive used as the fixing layer 30 is, for example, acrylic resin, epoxy resin, silicone resin, or fluororesin. The inorganic adhesive used as the fixing layer 30 is, for example, a silica adhesive, an alumina adhesive, or a ceramic-based adhesive. The low-melting glass is, for example, fritted glass or silicate glass.

It is to be noted, for example, as illustrated in FIG. 2, the fixing layer 30 may be omitted in the phosphor substrate 1. In this case, the phosphor layer 10 is directly fixed to the substrate 20 without intervention of the fixing layer 30. In this case, a binder included in the substrate 20 and the phosphor layer 10 may include a ceramic material. At this time, the substrate 20 and the phosphor layer 10 may be formed, for example, by performing sintering in a state where a plurality of layers including the ceramic material are bonded to each other.

In the phosphor substrate 1, in a case where the fixing layer 30 is omitted, the substrate 20 and the phosphor layer 10 may be bonded to each other by, for example, ambient temperature bonding or optical contact. For the ambient temperature bonding, there are surface-activated bonding and atomic diffusion bonding. The surface-activated bonding refers to a bonding method of bonding two materials without adding an adhesive, heat, pressure, etc., by performing a surface treatment thereby causing activation on bonding surfaces of the materials in a vacuum. The bonding surfaces of the materials are activated, by removing oxide and impurities present on the bonding surfaces of the materials by argon spattering, etc. The atomic diffusion bonding refers to a bonding method of bonding two materials at an ambient temperature, without application of pressure, and without application of voltage, by forming fine crystal films in an ultrahigh vacuum on bonding surfaces of materials, and overlaying two thin films in a vacuum. The optical contact refers to a bonding method of stabilizing molecules of planes to make these molecules behave like internal molecules, by causing interaction between the molecules of the planes, by bringing the planes subjected to precision polishing into tight contact with each other.

Figure 3B:
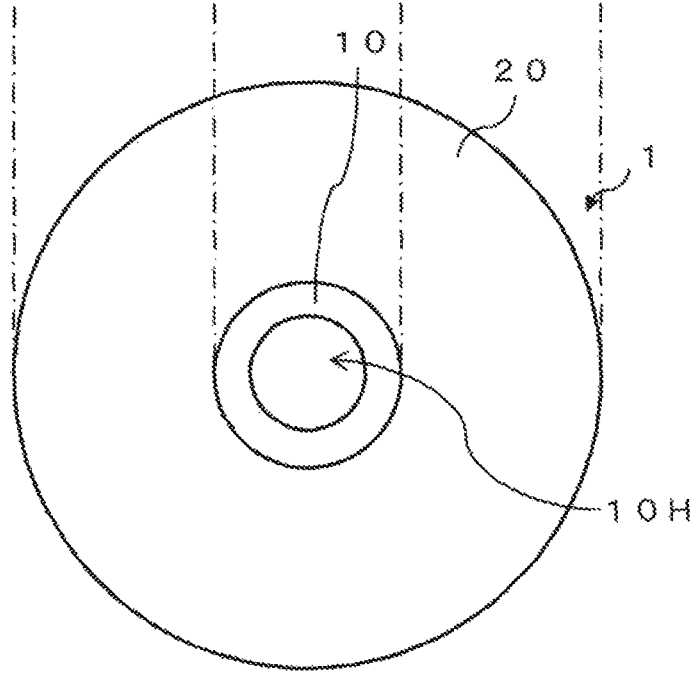

It is to be noted that, for example, as illustrated in FIGS. 3(A) and 3(B), the phosphor layer 10 may be shaped like a ring having an opening 10H at a center of the phosphor layer 10. At this time, the phosphor layer 10 is disposed, for example, concentrically with the substrate 20. In addition, at this time, the phosphor layer 10 has a diameter (an outer diameter) equal to the diameter D1 described above. The phosphor layer 10 has an inner diameter (a diameter of the opening 10H) smaller than an inner diameter of a radiation region (an optical irradiation region 10B (see FIG. 14) described later) of exciting light to irradiate the phosphor layer 10.

FIG. 4 illustrates a cross-sectional configuration example of the phosphor substrate 1, the attachment 42, the shaft 41, and screws 43, when the shaft 41 of a motor is attached to the phosphor substrate 1 through the attachment 42. FIG. 5 perspectively illustrates an exploded state of components attached to the phosphor substrate 1 in FIG. 4. It is to be noted that FIG. 4 illustrates an example of a state where the shaft 41 of the motor is attached to the phosphor substrate 1 illustrated in FIGS. 1(A) and 1(B), through the attachment 42. It is to be noted that the shaft 41 of the motor may be attached to, instead of the phosphor substrate 1 illustrated in FIGS. 1(A) and 1(B), the phosphor substrate 1 illustrated in FIGS. 3(A) and 3(B), through the attachment 42.

The attachment 42 is intended to couple the phosphor substrate 1 and a front end of the shaft 41 of the motor to each other. The attachment 42 corresponds to a specific example of a "support section" of the disclosure. The attachment 42 is configured to be rotatable, and is, for example, rotationally symmetric. The attachment 42 has, for example, a disk shape. The attachment 42 supports a portion except for the center of the substrate 20. The attachment 42 supports a portion, of the substrate 20, not facing the phosphor layer 10. The attachment 42 supports, for example, as illustrated in FIG. 4, only the portion, of the substrate 20, not facing the phosphor layer 10. In other words, the attachment 42 is fixed to the substrate 20 while avoiding, for example, a portion, of the substrate 20, immediately below the phosphor layer 10.

The shaft 41 is fixed to an undersurface of the attachment 42, and, for example, fixed to the undersurface of the attachment 42 by an adhesive, etc. The attachment 42 has, for example, a shape to be rotationally symmetric about the rotation axis AX1 of the shaft 41, when the attachment 42 is attached to the shaft 41. The attachment 42 has, for example, a concave section 42A having a recess formed at least at a portion facing the phosphor layer 10. The concave section 42A corresponds to a specific example of a "first concave section" and a "concave section" of the technology. The concave section 42A forms a clearance between a portion, of the substrate 20, facing the phosphor layer 10 and the attachment 42.

The attachment 42 has, for example, a plurality of openings 42B for engagement with the screws 43, at an outer edge of the attachment 42. The substrate 20 has an opening 21 for engagement with the screw 43, in a one-by-one fashion, at a location corresponding to each of the openings 42B when the attachment 42 is attached to the substrate 20. The attachment 42 is fixed to the substrate 20, by engaging the screws 43 in the openings 42B and the openings 21. It is to be noted that the openings 42B, the openings 21, and the screws 43 may be omitted. In that case, however, the attachment 42 is fixed to the substrate 20 through, for example, an adhesive, etc.

FIG. 6 illustrates a cross-sectional configuration example of the phosphor substrate 1, the attachment 42, the shaft 41, and the screws 43, when the shaft 41 of the motor is attached to the phosphor substrate 1 through the attachment 42. FIG. 7 perspectively illustrates an exploded state of components attached to the phosphor substrate 1 in FIG. 6. It is to be noted that FIG. 6 illustrates an example of a state where the shaft 41 of the motor is attached to the phosphor substrate 1 illustrated in FIGS. 1(A) and 1(B), through the attachment 42. It is to be noted that the shaft 41 of the motor may be attached to, instead of the phosphor substrate 1 illustrated in FIGS. 1(A) and 1(B), the phosphor substrate 1 illustrated in FIGS. 3(A) and 1(B), through the attachment 42.

The attachment 42 has, for example, as illustrated in FIG. 6 and FIG. 7, an opening 42C for engagement with the front end of the shaft 41. The opening 42C corresponds to a specific example of a "fixing section" of the disclosure. The opening 42C is provided at an undersurface of the concave section 42A to fix the shaft 41 of the motor. The shaft 41 is fixed to the attachment 42, by engaging the front end of the shaft 41 in the opening 42C. At this time, it is preferable that, for example, as illustrated in FIG. 6 and FIG. 7, the shaft 41 have a convex section 41A matching with shape and size of the opening 42C, at the front end of the shaft 41.

FIG. 8 illustrates a cross-sectional configuration example of the phosphor substrate 1, an attachment 44, the shaft 41, and the screws 43, when the shaft 41 of the motor is attached to the phosphor substrate 1 through the attachment 44. FIG. 9 perspectively illustrates an exploded state of components attached to the phosphor substrate 1 in FIG. 8. It is to be noted that FIG. 8 illustrates an example of a state where the shaft 41 of the motor is attached to the phosphor substrate 1 illustrated in FIGS. 1(A) and 1(B), through the attachment 44. It is to be noted that the shaft 41 of the motor may be attached to, instead of the phosphor substrate 1 illustrated in FIGS. 1(A) and 1(B), the phosphor substrate 1 illustrated in FIGS. 3(A) and 3(B), through the attachment 42.

The attachment 44 is intended to couple the phosphor substrate 1 and the front end of the shaft 41 of the motor to each other. The attachment 44 corresponds to a specific example of a "support section" of the disclosure. The attachment 44 is configured to be rotatable, and is, for example, rotationally symmetric. The attachment 44 has, for example, a disk shape. The attachment 44 supports a portion except for the center of the substrate 20. The attachment 44 supports a portion, of the substrate 20, not facing the phosphor layer 10. The attachment 44 supports, for example, as illustrated in FIG. 8, only the portion, of the substrate 20, facing the phosphor layer 10. In other words, the attachment 44 is fixed to the substrate 20, while avoiding, for example, a portion, of the substrate 20, immediately below the phosphor layer 10.

The shaft 41 is fixed to an undersurface of the attachment 44. For example, the shaft 41 may be fixed to the undersurface of the attachment 44 by an opening 44C, etc. described later, or may be fixed to the undersurface of the attachment 44 by an adhesive, etc. The attachment 44 has, for example, a shape to be rotationally symmetric about the rotation axis AX1 of the shaft 41, when the attachment 44 is attached to the shaft 41.

The attachment 44 has, for example, a plurality of concave sections 44B for engagement with the screws 43, at an outer edge of a top surface of the attachment 44. The attachment 44 further has, for example, a plurality of convex sections 44A, at the outer edge (i.e., a portion not facing the phosphor layer 10) of the top surface of the attachment 44. The convex section 44A corresponds to a specific example of a "convex section" of the disclosure. The plurality of convex sections 44A form a clearance between the portion, of the substrate 20, facing the phosphor layer 10 and the attachment 42. Each of the convex sections 44A has one or more of the concave sections 44B, at a top surface. The substrate 20 has the opening 21 for engagement with the screw 43, at a location corresponding to each of the concave sections 44B when the attachment 44 is attached to the substrate 20. The attachment 44 is fixed to the substrate 20, by engaging the screws 43 in the concave sections 44B and the openings 21. It is to be noted that the concave sections 44B, the openings 21, and the screws 43 may be omitted. In that case, however, each of the convex sections 44A of the attachment 44 is fixed to the substrate 20 through, for example, an adhesive, etc.

FIG. 10 illustrates a cross-sectional configuration example of the phosphor substrate 1, the attachment 42, the shaft 41, and the screws 43, when the shaft 41 of the motor is attached to the phosphor substrate 1 through the attachment 42. FIG. 11 perspectively illustrates an exploded state of components attached to the phosphor substrate 1 in FIG. 10. It is to be noted that FIG. 10 illustrates an example of a state where the shaft 41 of the motor is attached to the phosphor substrate 1 illustrated in FIGS. 1(A) and 1(B), through the attachment 42. It is to be noted that the shaft 41 of the motor may be attached to, instead of the phosphor substrate 1 illustrated in FIGS. 1(A) and 1(B), the phosphor substrate 1 illustrated in FIGS. 3(A) and 3(B), through the attachment 42.

The attachment 42 has, for example, as illustrated in FIG. 10 and FIG. 11, a ring-shaped concave section 42D, around a location (e.g., the opening 42C) to which the shaft 41 is fixed, of the undersurface of the concave section 42A. The concave section 42D corresponds to a specific example of a "third concave section" of the disclosure. Hence, a distance between the phosphor layer 10 (a heat source) and the shaft 41 is increased, for example, as indicated with an arrow in FIG. 10.

FIG. 12 illustrates a cross-sectional configuration example of the phosphor substrate 1, an attachment 45, the shaft 41, and the screws 43, when the shaft 41 of the motor is attached to the phosphor substrate 1 through the attachment 45. FIG. 13 perspectively illustrates an exploded state of components attached to the phosphor substrate 1 in FIG. 12. It is to be noted that FIG. 12 illustrates an example of a state where the shaft 41 of the motor is attached to the phosphor substrate 1 illustrated in FIGS. 1(A) and 1(B), through the attachment 45. It is to be noted that the shaft 41 of the motor may be attached to, instead of the phosphor substrate 1 illustrated in FIGS. 1(A) and 1(B), the phosphor substrate 1 illustrated in FIGS. 3(A) and 3(B), through the attachment 45.

The attachment 45 is intended to couple the phosphor substrate 1 and the front end of the shaft 41 of the motor to each other. The attachment 45 corresponds to a specific example of a "support section" of the disclosure. The attachment 45 is configured to be rotatable, and is, for example, rotationally symmetric. The attachment 45 has, for example, a disk shape. The attachment 45 supports a portion except for the center of the substrate 20. The attachment 45 supports a portion, of the substrate 20, not facing the phosphor layer 10. The attachment 45 supports, for example, as illustrated in FIG. 12, the portion, of the substrate 20, not facing the phosphor layer 10 and a part of a portion, of the substrate 20, facing the phosphor layer 10.

The shaft 41 is fixed to an undersurface of the attachment 45. For example, the shaft 41 may be fixed to the undersurface of the attachment 45 by the above-described opening 42C, etc., or may be fixed to the undersurface of the attachment 45 by an adhesive, etc. The attachment 45 has, for example, a shape to be rotationally symmetric about the rotation axis AX1 of the shaft 41, when the attachment 45 is attached to the shaft 41. The attachment 45 has, for example, a plurality of concave sections 45A, at a portion facing the phosphor layer 10. The concave section 45A corresponds to a specific example of a "second concave section" of the technology. The concave sections 45A each form a clearance between the substrate 20 and the attachment 45.

The attachment 45 has, for example, a plurality of openings 45B for engagement with the screws 43, at an outer edge of the attachment 45. The substrate 20 has the opening 21 for engagement with the screw 43, in a one-by-one fashion, at a location corresponding to each of the openings 45B when the attachment 45 is attached to the substrate 20. The attachment 45 is fixed to the substrate 20 by engaging the screws 43 in the openings 45B and the openings 21. It is to be noted that the openings 45B, the openings 21, and the screws 43 may be omitted. In that case, however, the attachment 45 is fixed to the substrate 20 through, for example, an adhesive, etc.

(Light Source Unit 2)

Next, the light source unit 2 according to the first embodiment of the disclosure will be described. FIG. 14 illustrates a schematic configuration example of the light source unit 2 using the phosphor substrate 1 and the attachment 42, 44, or 45. The light source unit 2 includes the light conversion section 2A to which the phosphor substrate 1 and the attachment 42, 44, or 45 described above are applied. The light source unit 2 includes the light conversion section 2A and a light source section 2B.

The light source section 2B is intended to irradiate the light conversion section 2A with exciting light L1. The light source section 2B corresponds to a specific example of a "light source" of the disclosure. The light source section 2B has, for example, two light sources 111, condensing mirrors 112, 113, and 114, and a dichroic mirror 115. The light sources 111 each output light (the exciting light L1) having a peak wavelength of light-emission intensity within a wavelength range suitable for exciting of the phosphor layer 10. Assume that the phosphor layer 10 includes a fluorescent substance that emits yellow fluorescence when excited by light (blue light) having a wavelength within a wavelength range of 400 nm to 500 nm. In this case, the light sources 111 each include, for example, a semiconductor laser or a light emitting diode that outputs blue light having a peak wavelength of light-emission intensity within the wavelength range of 400 nm to 500 nm, as the exciting light L1.

The condensing mirrors 112 and 113 are each, for example, a concave reflecting mirror, and reflect the light (the exciting light L1) outputted from the two light sources 111 toward the condensing mirror 114 and to condense the light. The condensing mirror 114 is, for example, a convex reflecting mirror, and brings the reflected light derived from the condensing mirrors 112 and 113 into parallel light to reflect this light toward the phosphor layer 10.

The dichroic mirror 115 reflects color light of a predetermined wavelength region selectively, and allows light of other wavelength regions to pass therethrough. The dichroic mirror 115 allows the light (the exciting light L1) outputted from the two light sources 111 to pass therethrough, and reflects light (fluorescence Lb) outputted from the phosphor layer 10. The dichroic mirror 115 is also allows light L3 outputted from a light source 117 described later to pass therethrough. Here, a traveling direction of the fluorescence Lb after reflected by the dichroic mirror 115 and a traveling direction of the light L3 are equal to each other. The dichroic mirror 115 therefore mixes the fluorescence Lb and the light L3 with each other, and outputs the mixed light in a predetermined direction. The light L3 is light having a peak wavelength of light-emission intensity within a wavelength range common to the exciting light L1. In a case where the exciting light L1 is blue light having a peak wavelength of light-emission intensity within the wavelength range of 400 nm to 500 nm, the light L3 is also blue light having a peak wavelength of light-emission intensity within the wavelength range of 400 nm to 500 nm.

The light source section 2B is intended to generate the light L3 that makes it possible to generate white light Lw by being mixed with the light (the fluorescence Lb) outputted from the light conversion section 2A. The light source section 2B further includes, for example, the one light source 117, and a condensing lens 116. The light source 117 outputs the light L3. The light source 117 includes a semiconductor laser or a light emitting diode that outputs the light L3. The condensing lens 116 condenses the mixed light (the white light Lw) generated by the dichroic mirror 115 and outputs the mixed light toward other optical system.

The light conversion section 2A is intended to output the fluorescence Lb having a peak of light-emission intensity within a wavelength range different from the wavelength range of the exciting light L1, toward the light source section 2B. The light conversion section 2A outputs the fluorescence Lb to the light source section 2B, by using the light outputted from the light source section 2B, as the exciting light L1. The light conversion section 2A has the phosphor substrate 1, a motor 121 coupled to the phosphor substrate 1 through the attachment 42, 44, or 45, and a condensing lens 122 disposed at a position facing a top surface of the phosphor substrate 1 with a predetermined gap formed therebetween. The motor 121 corresponds to a specific example of a "motor" of the disclosure. The attachments 42, 44, and 45 each transmit rotation driving force of the motor 121 to the substrate 20. The condensing lens 122 is intended to condense the exciting light L1 inputted from the light source section 2B to irradiate a predetermined position of the phosphor layer 10. The condensing lens 122 includes, for example, a lens 122a and a lens 122b.

FIG. 15 and FIG. 16 illustrate an example of application of the exciting light L1 to the phosphor substrate 1, in the light source unit 2. The condensing lens 124 is configured such that an outer edge of the top surface of the phosphor layer 10 is irradiated with the exciting light L1 after condensed by the condensing lens 124. Here, assume that when the phosphor layer 10 does not rotate, a portion to be irradiated with the exciting light L1 is an optical irradiation point 10A, in the phosphor layer 10. When the phosphor layer 10 is to be irradiated with the exciting light L1, the phosphor layer 10 rotates about the rotation axis AX1 together with the substrate 20 and therefore, the outer edge of the top surface of the phosphor layer 10 is circularly irradiated with the exciting light L1, while the phosphor layer 10 rotates. The optical irradiation point 10A therefore moves along the outer edge of the top surface of the phosphor layer 10, while the phosphor layer 10 rotates. It is to be noted that the optical irradiation region 10B in FIG. 16 corresponds to a ring-shaped region through which the optical irradiation point 10A passes, on the top surface of the phosphor layer 10.

Incidentally, assume that an energy distribution of the exciting light L1 is a Gaussian distribution. In this case, the exciting light L1 has a beam diameter corresponding to a diameter of a bundle of rays having a strength of $1/e^2$ ($=13.5\%$) of a central strength. Here, assume that the optical irradiation point 10A has a diameter equal to the beam diameter of the exciting light L1. At this time, the optical irradiation region 10B has a line width equal to the diameter of the optical irradiation point 10A and therefore, the line width of the optical irradiation region 10B is equal to the beam diameter of the exciting light L1.

Here, 99.9% or more of total energy of the exciting light L1 is in a bundle of rays having a diameter 1.52 times longer than the beam diameter of the exciting light L1. It is therefore preferable that the condensing lens 122 be disposed such that the top surface of the phosphor layer 10 is irradiated with the bundle of rays having the diameter 1.52 times longer than the beam diameter of the exciting light L1 (the diameter of the optical irradiation point 10A). Assume that the beam diameter of the exciting light L1 (the diameter of the optical irradiation point 10A) is 3 mm from a viewpoint such as light conversion efficiency. At the time, it is preferable that the condensing lens 122 be disposed such that the center of the optical irradiation point 10A is located at a position 2.28 mm ($=3$ mm$\times 1.52/2$) or more away from an end edge of the top surface of the phosphor layer 10.

It is to be noted that the condensing lens 124 may be disposed such that the center of the optical irradiation point 10A is located at a position only 2.28 mm ($=3$ mm$\times 1.52/2$) from the end edge of the top surface of the phosphor layer 10. At this time, a stripe-shaped region between the end edge of the top surface of the phosphor layer 10 and a position 4.56 mm ($=2.28$ mm$\times 2$) away from the end edge of the top surface of the phosphor layer 10 is irradiated with the bundle of rays having the diameter 1.52 times longer than the beam diameter of the exciting light L1 (the diameter of the optical irradiation point 10A). In this case, therefore, of the phosphor layer 10, a portion away from the end edge of the top surface of the phosphor layer 10 by more than 4.56 mm does not contribute to generation of the exciting light Lb. For this reason, the phosphor layer 10 may be configured by only a portion contributing to the generation of the exciting light Lb, or may have, for example, a ring shape having the opening 10H, as illustrated in FIG. 17 and FIG. 18. At this time, the phosphor layer 10 has a line width greater than the diameter 1.52 times longer than the beam diameter of the exciting light L1 (the diameter of the optical irradiation point 10A). In a case where the beam diameter of the exciting light L1 (the diameter of the optical irradiation point 10A) is 3 mm from the viewpoint such as the light conversion efficiency, the line width of the phosphor layer 10 is greater than 4.56 mm.

[Effects]

Next, effects of the phosphor substrate 1 and the light source unit 2 of the present embodiment will be described.

In general, for light emission of a phosphor layer, there is a phenomenon called luminance saturation or temperature quenching. This is such a phenomenon that, in a case where an output of exciting light is increased, a part of a conversion loss in a phosphor layer changes to heat that causes the phosphor layer to generate heat, and fluorescence conversion efficiency thereby drops. In a state where the fluorescence conversion efficiency is low, an efficient, bright light source unit is not implementable. Hence, the phosphor layer is provided on a surface of a substrate having high thermal conductivity.

Incidentally, a phosphor layer and a substrate provided with the phosphor layer are fixed to each other through a bonding layer, etc., or directly fixed to each other by ambient temperature bonding or optical contact. Hence, in a case where warping occurs in the substrate due to stress caused by thermal expansion of each of the phosphor layer and the substrate, and a focal position of exciting light is thereby displaced, fluorescence conversion efficiency may drop.

In the present embodiment, however, the phosphor layer 10 is disposed at the center of the substrate 20. For this reason, even if warping occurs in the substrate 20 due to the stress caused by the thermal expansion of each of the phosphor layer 10 and the substrate 20, it is possible to make a displacement amount of the phosphor layer 10 small, as compared with a case where a phosphor layer is disposed on an outer edge of a substrate or the entire substrate. As a result, it is possible to reduce a displacement of a focal position due to the thermal expansion.

In addition, in the present embodiment, in a case where the substrate 20 and the phosphor layer 10 are configured of materials in which the difference in linear expansion coefficient between the substrate 20 and the phosphor layer 10 is $1\times 10^{-6}$ cm/° C. or less, it is possible to make a displacement amount of the phosphor layer 10 small, as compared with a case where a substrate and a phosphor layer are configured of materials in which a difference in linear expansion coefficient between the substrate and the phosphor layer 10 exceeds $1\times 10^{-6}$ cm/° C. As a result, it is possible to reduce the displacement of the focal position due to the thermal expansion.

Further, in general, a phosphor layer is rotated by a motor attached to a substrate having high thermal conductivity. In a case where heat generated in the phosphor layer is transferred to the motor through the substrate, reliability of the motor may decrease due to a temperature rise of the motor.

In the present embodiment, however, there is provided the attachment 42, 44, or 45 that supports the portion, of the substrate 20, except for the center of the substrate 20. This makes it difficult for the heat generated in the phosphor layer 10 to travel to the motor 121 through the substrate 20, as compared with a case where an attachment supports the entire center, of the substrate 20, at which the phosphor layer 10 is disposed. As a result, it is possible to suppress a decline in reliability of the motor 121 due to a temperature rise of the motor 121.

<2. Second Embodiment>

[Configuration]

Next, a projector 5 according to a third embodiment of the disclosure will be described. The projector 5 corresponds to a specific example of a "projection-type display" of the disclosure. FIG. 19 illustrates a schematic plane configuration example of the projector 5 according to the third embodiment of the disclosure. The projector 5 includes the above-described light source unit 2 or the above-described light source unit 4. The projector 5 further includes an image generation system 6 and a projection optical system 7.

The image generation system 6 generates image light of a plurality of colors by modulating the light (the white light Lw) outputted from the above-described light source unit 2 or the above-described light source unit 4 on the basis of an image signal, and combines the generated image light of plurality of colors to output the combined image light to the projection optical system 7. The image generation system 6 has an illumination optical system 410, an image generation section 420, and an image combining section 430. The projection optical system 7 projects the image light (the combined image light) outputted from the image generation system 6, onto a screen, etc. The image generation system 6 corresponds to a specific example of an "optical modulation section" of the disclosure. The projection optical system 7 corresponds to a specific example of a "projection section" of the disclosure.

The illumination optical system 410 separates the light (the white light Lw) outputted from the above-described light source unit 2 or the above-described light source unit 4 into a plurality of pieces of color light. The illumination optical system 410 has, for example, an integrator device 411, a polarization conversion device 412, a condensing lens 413, dichroic mirrors 414 and 415, and mirrors 416 to 418. The integrator device 411 has, for example, a fly-eye lens 411a and a fly-eye lens 411b. The fly-eye lens 411a has a plurality of micro-lenses arranged two-dimensionally. The fly-eye lens 411b also has a plurality of micro-lenses arranged two-dimensionally. The fly-eye lens 411a divides the light (the white light Lw) outputted from the above-described light source unit 2 or the above-described light source unit 4 into a plurality of bundle of rays, and forms an image at each of the micro-lenses in the fly-eye lens 411b. The fly-eye lens 411b serves as a secondary light source, and allows a plurality of pieces of parallel light of the same luminance as each other to enter the polarization conversion device 412. The dichroic mirrors 414 and 415 reflect color light of a predetermined wavelength region selectively, and allow light of other wavelength regions to pass therethrough. The dichroic mirror 414 reflects, for example, red light selectively. The dichroic mirror 415 reflects, for example, green light selectively.

The image generation section 420 modulates each of the pieces of color light separated by the illumination optical system 410, on the basis of an image signal corresponding to each of colors inputted from outside, and generates image light of each of the colors. The image generation section 420 has, for example, a light valve 421 for red light, a light valve 422 for green light, and a light valve 423 for blue light. The light valve 421 for red light modulates red light inputted from the illumination optical system 410, on the basis of an image signal corresponding to red inputted from outside, and thereby generates red image light. The light valve 422 for green light modulates green light inputted from the illumination optical system 410, on the basis of an image signal corresponding to green inputted from outside, and thereby generates green image light. The light valve 423 for blue light modulates blue light inputted from the illumination optical system 410, on the basis of an image signal corresponding to blue inputted from outside, and thereby generates image light of the blue.

The image combining section 430 combines the image light of each of the colors generated in the image generation section 420, and thereby generates color image light.

[Effects]

Next, effects of the projector 5 of the present embodiment will be described.

In the present embodiment, the light source unit 2 of the above-described embodiment or the light source unit 4 of the above-described embodiment is used as a light source. This makes it possible to reduce the displacement of the focal position due to the thermal expansion in the light source unit 2 of the above-described embodiment or the light source unit 4 of the above-described embodiment and thus, it is possible to suppress luminance of the color image light outputted from the projector 5 from becoming lower than a desirable value.

As described above, the disclosure is described by referring to the three embodiments, but the disclosure is not limited to each of the above-described embodiments, and various modifications may be made. It is to be noted that the effects described herein are mere examples. Effects of the disclosure are not limited to the effects described herein. The disclosure may have effects other than the effects described herein.

For example, in the above-described embodiments, the example in which the disclosure is applied to the light source unit of the projector 5 is described, but of course, it is also possible to apply the disclosure to, for example, an illumination unit. Examples of the illumination unit include a headlight of a vehicle, etc.

In addition, for example, the technology may adopt the following configurations.

(1) A light source unit including:
   a substrate configured to be rotatable;
   a phosphor layer disposed at a center of the substrate;
   a light source that irradiates the phosphor layer with exciting light; and
   a support section that supports a portion, of the substrate, except for the center of the substrate.

(2) The light source unit according to (1), in which the support section supports a portion, of the substrate, not facing the phosphor layer.

(3) The light source unit according to (1) or (2), in which the support section supports only the portion, of the substrate, not facing the phosphor layer.

(4) The light source unit according to (3), in which
   the support section has a first concave section having a recess formed at least at a portion facing the phosphor layer, and
   the first concave section forms a clearance between a portion, of the substrate, facing the phosphor layer and the support section.

(5) The light source unit according to (3), in which
the support section has a plurality of convex sections at a portion not facing the phosphor layer, and
the plurality of convex sections form a clearance between a portion, of the substrate, facing the phosphor layer and the support section.
(6) The light source unit according to (1) or (2), in which the support section supports the portion, of the substrate, not facing the phosphor layer and a part of a portion, of the substrate, facing the phosphor layer.
(7) The light source unit according to (6), in which
the support section has a plurality of second concave sections at a portion facing the phosphor layer, and
the second concave sections each form a clearance between the support section and the substrate.
(8) The light source unit according to (5), in which the support section has a fixing section that fixes a shaft of a motor, at an undersurface of the first concave section.
(9) The light source unit according to (8), in which the support section has a ring-shaped second concave section, around the fixing section, of the undersurface of the first concave section.
(10) The light source unit according to any one of (1) to (9), in which
the substrate and the phosphor layer have a disk shape, and
the phosphor layer is disposed concentrically with the substrate.
(11) The light source unit according to any one of (1) to (9), in which
the substrate has a disk shape, and
the phosphor layer has a ring shape, and is disposed concentrically with the substrate.
(12) The light source unit according any one of (1) to (11), in which
the light source unit has a motor coupled to the support section, and
the support section transmits rotation driving force of the motor to the substrate.
(13) A projection-type display including:
a substrate configured to be rotatable;
a phosphor layer disposed at a center of the substrate;
a light source that irradiates the phosphor layer with exciting light;
a support section that supports a portion, of the substrate, except for the center of the substrate;
an optical modulation section that generates image light by modulating the exciting light outputted from the light source, on a basis of an image signal; and
a projection section that projects the image light generated by the optical modulation section.

This application is based upon and claims the benefit of priority of the Japanese Patent Application No. 2015-099920 filed with the Japan Patent Office on May 15, 2015, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A light source unit, comprising:
a substrate that is rotatable;
a phosphor layer at a center of the substrate;
a light source configured to irradiate the phosphor layer with exciting light; and
a rotatable support section configured to support a first portion of the substrate, wherein the first portion is other than the center of the substrate.

2. The light source unit according to claim 1, wherein the first portion of the substrate is other than a second portion of the substrate that faces the phosphor layer.

3. The light source unit according to claim 2, wherein the rotatable support section is further configured to support the first portion of the substrate.

4. The light source unit according to claim 3, wherein
the rotatable support section has a first concave section having a recess formed at the second portion of the substrate, and
the first concave section forms a first clearance between the second portion of the substrate and the rotatable support section.

5. The light source unit according to claim 3, wherein
the rotatable support section has a plurality of convex sections at the first portion of the substrate, and
the plurality of convex sections form a clearance between the first portion of the substrate and the rotatable support section.

6. The light source unit according to claim 2, wherein the rotatable support section is further configured to support the first portion of the substrate and a part of the second portion of the substrate.

7. The light source unit according to claim 4, wherein
the rotatable support section has a plurality of second concave sections at the second portion of the substrate, and
each second concave section of the plurality of second concave sections forms a second clearance between the rotatable support section and the substrate.

8. The light source unit according to claim 4, wherein the rotatable support section has a fixing section that fixes a shaft of a motor, at an undersurface of the first concave section.

9. The light source unit according to claim 8, wherein
the rotatable support section has a second concave section, around the fixing section, of the undersurface of the first concave section, and
a shape of the second concave section is ring-shaped.

10. The light source unit according to claim 2, wherein
the substrate and the phosphor layer have a disk shape, and
the phosphor layer is concentric with the substrate.

11. The light source unit according to claim 2, wherein
the substrate has a disk shape,
the phosphor layer has a ring shape, and
the phosphor layer is concentric with the substrate.

12. The light source unit according to claim 2, further comprising a motor coupled to the rotatable support section, wherein the rotatable support section is further configured to transmit rotation driving force of the motor to the substrate.

13. A projection-type display, comprising:
a substrate that is rotatable;
a phosphor layer at a center of the substrate;
a light source configured to irradiate the phosphor layer with exciting light;
a rotatable support section configured to support a portion of the substrate, wherein the portion is other than the center of the substrate;
an optical modulation section configured to generate image light by modulation of the exciting light, wherein the modulation is based on an image signal; and a projection section is configured to project the image light.

14. A light source unit, comprising:

a substrate that is rotatable;

a phosphor layer at a center of the substrate;

a light source configured to irradiate the phosphor layer with exciting light;

a support section configured to support a portion, of the substrate, except for the center of the substrate, wherein the support section is configured to support the portion, of the substrate, not facing the phosphor layer; and a motor coupled to the support section, wherein the support section is further configured to transmit rotation driving force of the motor to the substrate.

15. A light source unit, comprising:

a substrate that is rotatable;

a phosphor layer at a center of the substrate;

a light source configured to irradiate the phosphor layer with exciting light; and a support section configured to support a portion, of the substrate, except for the center of the substrate, wherein the support section is configured to support the portion, of the substrate, not facing the phosphor layer and a part of a portion, of the substrate, facing the phosphor layer.

16. A light source unit, comprising:

a substrate that is rotatable;

a phosphor layer at a center of the substrate;

a light source configured to irradiate the phosphor layer with exciting light; and a support section configured to support a portion, of the substrate, except for the center of the substrate, wherein the support section is configured to support the portion, of the substrate, not facing the phosphor layer, the substrate has a disk shape, the phosphor layer has a ring shape, and the phosphor layer is disposed concentrically with the substrate.

* * * * *